F. W. HOTTENROTH.
TREAD ATTACHMENT FOR VEHICLE WHEELS.
APPLICATION FILED SEPT. 27, 1917.
1,269,446.
Patented June 11, 1918.
3 SHEETS—SHEET 1.
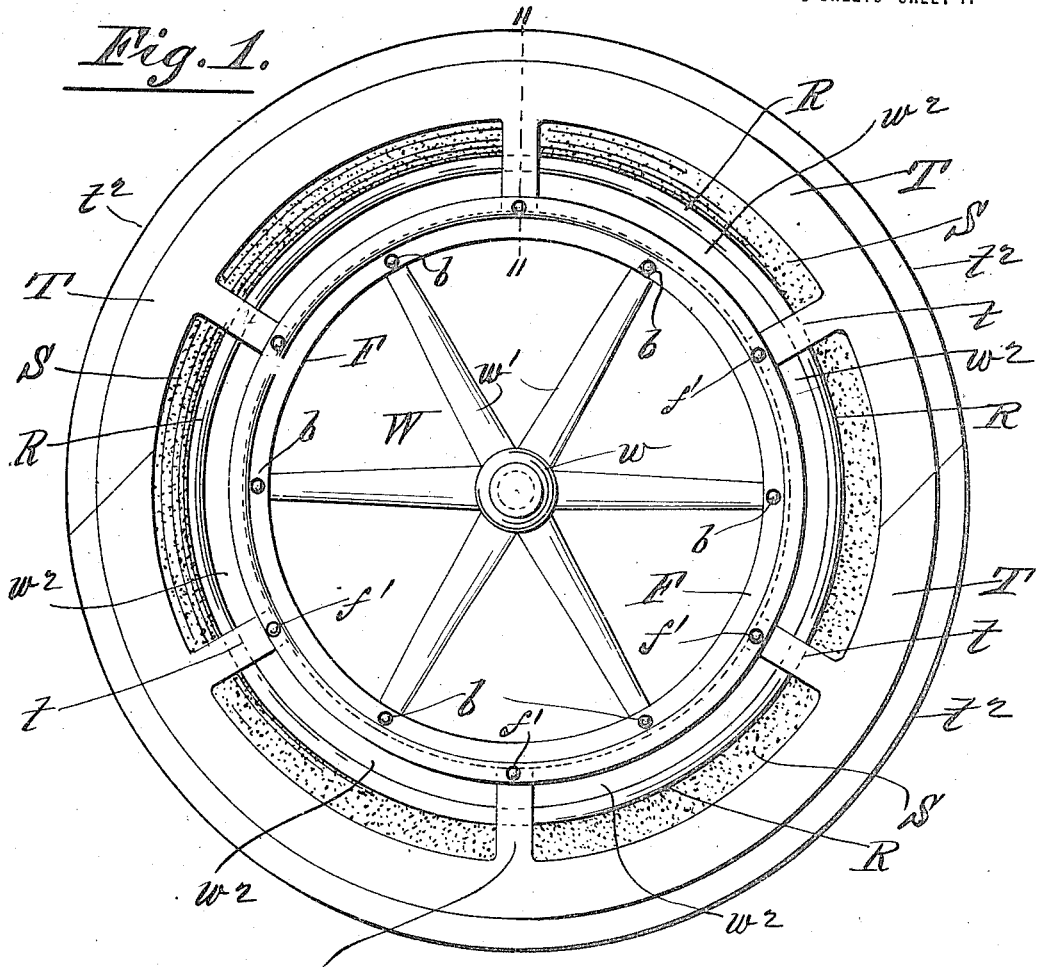
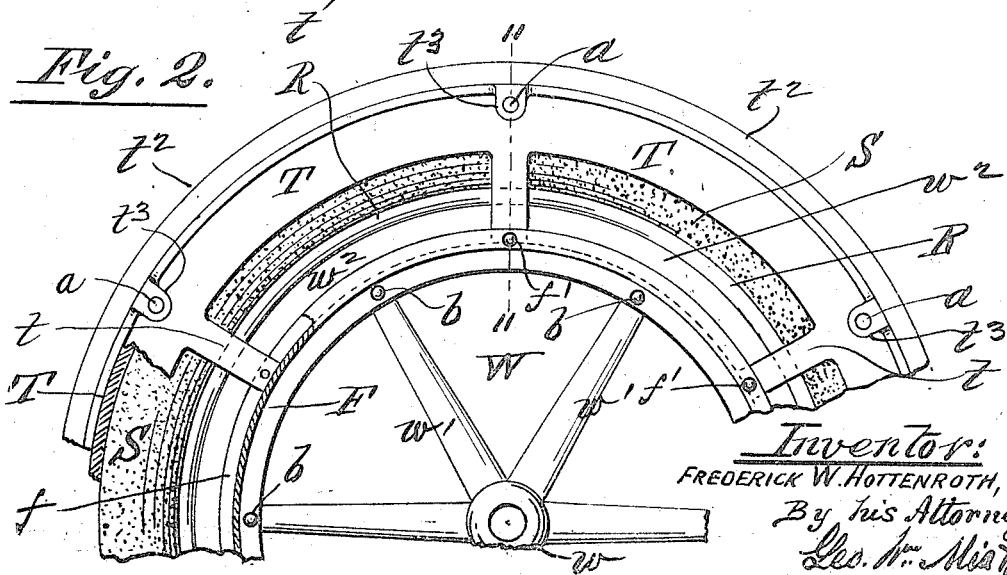
Inventor:
FREDERICK W. HOTTENROTH,
By his Attorney

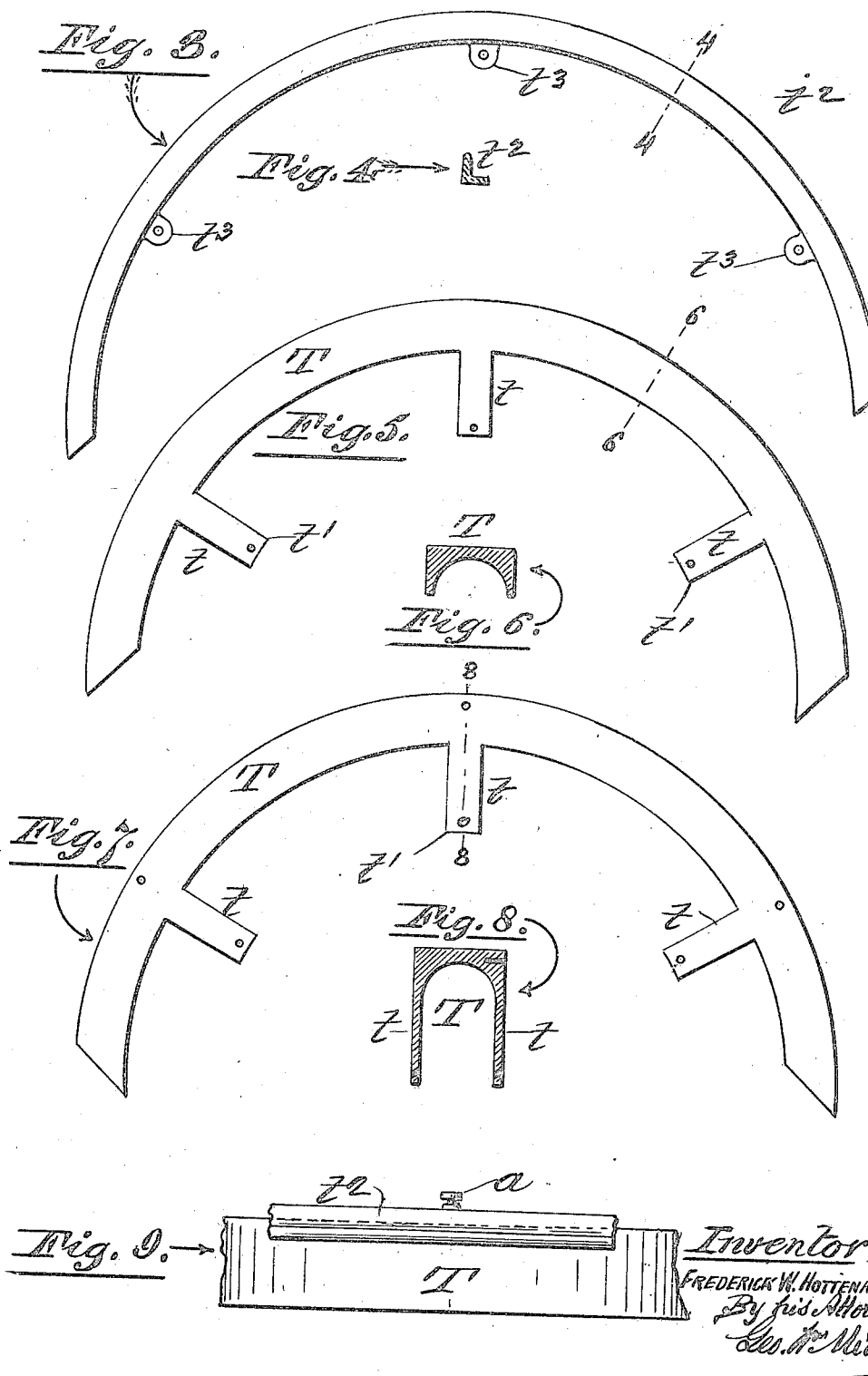

F. W. HOTTENROTH.
TREAD ATTACHMENT FOR VEHICLE WHEELS.
APPLICATION FILED SEPT. 27, 1917.
1,269,446.
Patented June 11, 1918.
3 SHEETS—SHEET 3.
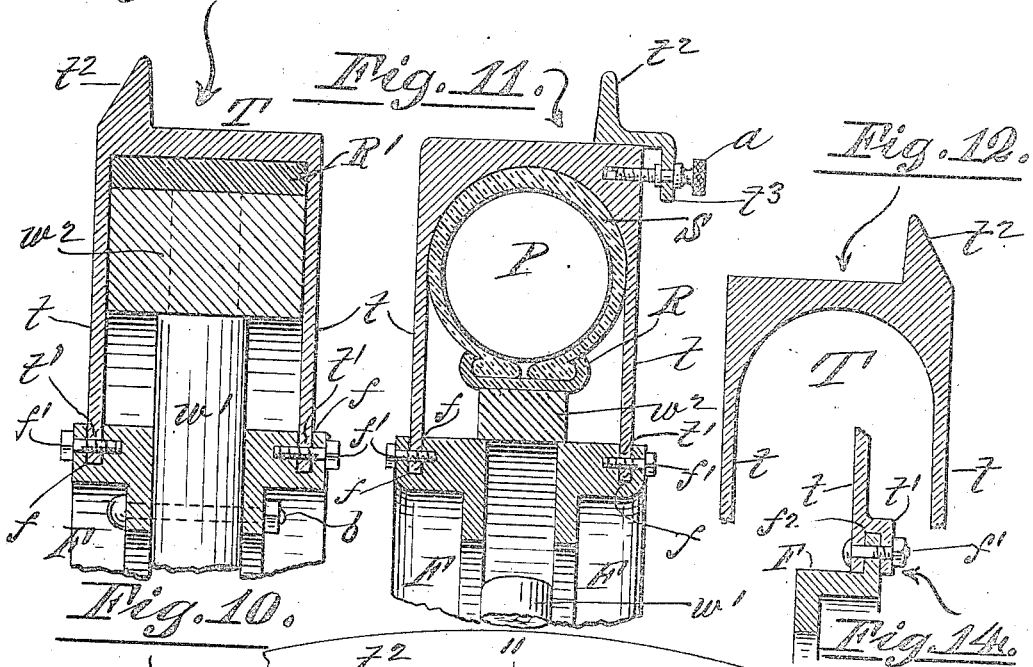
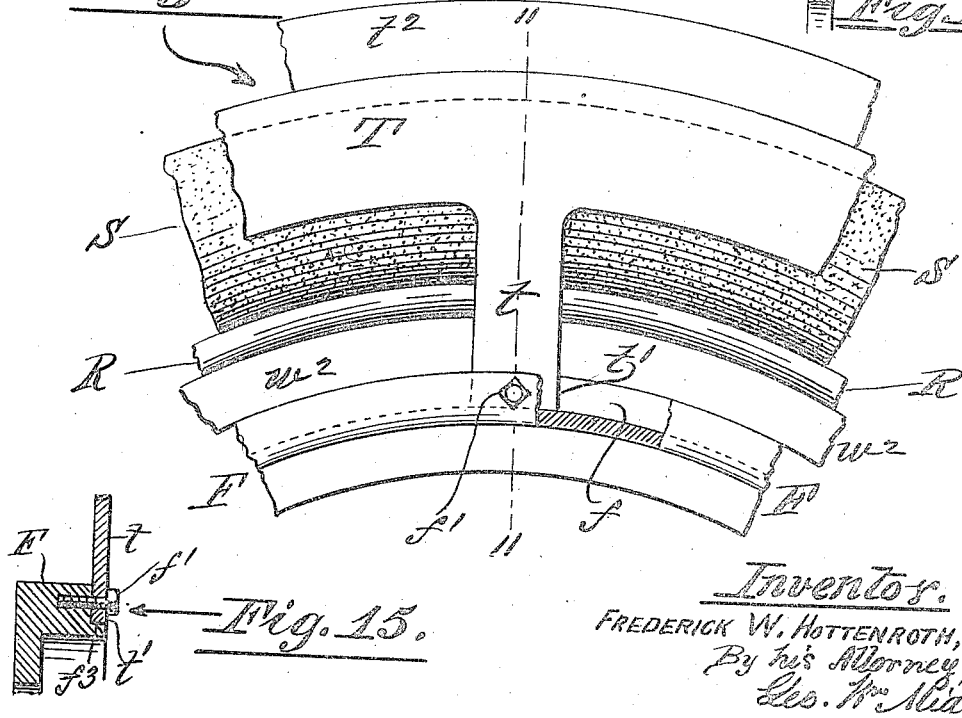
Inventor.
FREDERICK W. HOTTENROTH,
By his Attorney

UNITED STATES PATENT OFFICE.

FREDERICK W. HOTTENROTH, OF NEW YORK, N. Y.

TREAD ATTACHMENT FOR VEHICLE-WHEELS.

1,269,446.

Specification of Letters Patent.

Patented June 11, 1918.

Application filed September 27, 1917. Serial No. 193,414.

*To all whom it may concern:*

Be it known that I, FREDERICK W. HOTTENROTH, a citizen of the United States, residing in the borough of Bronx, county of Bronx, city and State of New York, have invented certain new and useful Improvements in Tread Attachments for Vehicle-Wheels, of which the following is a specification.

My improvements are applicable to vehicle wheels generally, and particularly for use in connection with elastic resilient tires such as used on automobiles, etc. The object of my invention is to afford simple but effective means whereby the wheels of ordinary road vehicles, automobiles, etc., may be readily converted and adapted to railway traffic by mains of auxiliary flanged tires which may be quickly and conveniently applied to or removed from the normal fixed tires without "jacking up" or raising the wheels; and the invention consists in the specific construction and arrangement of parts described and claimed,—distinctive features being the making of the auxiliary tires in a plurality of sections so that they may be readily fitted over the fixed tires; the making of the rail flanges adjustable on the auxiliary tires, etc., all as hereinafter fully set forth.

In the accompanying drawings,

Figure 1, is an elevation of the outer side of an automobile wheel and attachments embodying the essential features of my invention;

Fig. 2, is a rear view of a portion of the same, partly in section;

Fig. 3, is a front view of one of the rail flange members;

Fig. 4, is a transverse section thereof, taken upon plane of line 4—4, Fig. 3;

Fig. 5, is a front view of one of the tread members;

Fig. 6, is a transverse section thereof, taken upon plane of line 6—6, Fig. 5;

Fig. 7, is a rear view of one of the tread members;

Fig. 8, is a transverse section, taken upon plane of line 8—8, Fig. 7;

Fig. 9, is a peripheral view of a portion of a tread member and its detachable flange;

Fig. 10, is a front elevation upon a larger scale, and partly in section, of the tire and attachments shown in the preceding views;

Fig. 11, is a transverse section taken upon plane of line 11—11, Fig. 10;

Fig. 12, is a transverse section of a modification of a tread member in which the rail flange is integral therewith;

Fig. 13, is a transverse section similar to Fig. 11, showing a modification of the tread attachment as applied to an ordinary road wagon wheel and tire.

Figs. 14, and 15, are sectional details showing modifications in the connection between the coupling flange and the auxiliary tread.

W, represents a wheel of any desired or ordinary construction, $w$, being the hub, and $w'$, the spokes thereof, to the outer ends of which the felly $w^2$, is rigidly secured in the usual manner. The above named parts are herein considered, treated, and named as the primary or basic central structure of the wheel to which are permanently and rigidly attached concentric annular coupling flanges F, F, one on either side thereof. In the drawings these flanges F, F, are shown as attached to the spokes $w'$, by screw bolts $b$, or equivalent mechanical expedients, although it is obvious that they might be secured to the felly with like result so that I do not limit myself in this respect,—the essential feature in this connection being the provision of a rigid annular flange on each face of the wheel recessed for the reception of the inner edges of the flanged auxiliary tread sections T, T, which are applied to the wheel over the normal or fixed tire when it is desired to adapt the wheel for railway traction.

In Figs. 1, 2, 10 and 11, the normal or fixed tire attached to the felly $w^2$, is shown as of the pneumatic type, P, representing the compressed air tube, and S, the shoe secured to said felly $w^2$, by a clencher rim R, in a manner well known in the art; whereas in Fig. 13, the felly $w^2$, is provided with the usual wagon road tire or tread R'. In either case my auxiliary tread sections T, are shaped internally to conform to the peripheral portion of the tire to which they are to be applied.

The sockets or recesses $f, f$, in the coupling flanges F, F, may be made in the form of annular grooves if desired, their principal function being to receive the inner edges $t'$, $t'$, of the tread flanges $t, t$, which extend inward from the peripheral portions of the auxiliary tread sections T, and may, if desired, extend the whole length of each tread section. In the drawings however I have shown said tread flanges $t, t$, in the form of equi-distant tongues or extensions of the auxiliary tread sections, the ends or inner edges $t'$, $t'$, of said tread flanges being secured within the grooves $f$, $f$, of the fixed coupling flanges F, F, by means of coupling screws $f'$, $f'$, which by preference extend through the edges $t'$, $t'$, of said flanges $t$, $t$, as shown in Figs. 11 and 13, thus insuring a positive interlocking of the parts. It is obvious that the form of attachment between the tread flanges $t$, $t$, and the fixed annular coupling flanges F, F, may be modified without departing from the spirit and intent of my invention in this respect, the essential feature being a positive rigid connection between said parts. Thus in Fig. 14, the end of this tread flange is grooved to straddle the shoulder $f^2$, on the coupling flange F, while in Fig. 15, the inner edge $t'$, of the tread flange $t$, simply fits against the side of the coupling flange which is formed with a supporting shoulder $f^3$.

The rail flange $t^2$, may form an integral part of each auxiliary tread section T, as shown in Figs. 12 and 13, when the railways to be traversed are of prescribed uniform gage, but where various widths of railway are to be encountered I make the rail flanges $t^2$, on my auxiliary tread sections T, adjustable thereon by suitable mechanical expedients, as for instance by means of a plurality of equi-distant screws $a$, swiveled to tongues $t^3$, pendent from the rail flanges $t^2$, and engaging female threads formed for them in the sides of the tread sections T, as shown more particularly in Fig. 11. By this means the rail flange $t^2$, may be readily advanced or retracted on each tread section T, to adapt the tread as a whole to the requirements of use on railroads of different gage. It also admits of the removal of the rail flange $t^2$, entirely from the tread section T, if it is desired to use the latter as an ordinary road tire, or merely for the protection of the pneumatic tire under exceptional and dangerous conditions of road surface.

My auxiliary tire is made in two or more sections, preferably two, as shown, although this is not imperative. When made of only two sections, each of course will consist of a half circle, so that the halves may be readily adjusted to the fixed tire of the wheel; and the abutting ends of the sections may be beveled off at an angle, preferably of forty-five degrees or thereabout, as shown in Figs. 1, 5 and 7, so that they contactually overlap, as shown in Fig. 1. This insures easy running, distributes the strain, and facilitates the applying of the sections T, to the wheel. For instance the first section is positioned on and secured to the uppermost side of the wheel, and the latter then rolled over to bring this applied section underneath, when the other section may be applied in like manner—the application of my auxiliary tread being thus effected without the necessity of raising or "jacking up" the wheel.

It is to be noted that my auxiliary tire sections T, when in use are, to all intents and purposes, rigidly attached to and supported by the coupling flanges F, F, thus reinforcing and sustaining the fixed tire; and this feature is of particular import in the case of pneumatic or other elastic resilient wheel tires (as for instance in Fig. 11) since such tires are thereby fully isolated and protected against the severe strain to which they might otherwise be subjected during railway traction, as well as against contact with rail flanges, etc.

Incidentally it may be mentioned that the annular coupling flanges F, F, perform a double function in that they not only afford adequate means for the attachment and support of the auxiliary tread sections T, T, but also reinforce and strengthen the central basic structure of the wheel as a whole.

What I claim as my invention and desire to secure by Letters Patent is,

1. The combination, with a vehicle wheel having rigidly incorporated with its central basic structure and on each side thereof an annular concentric coupling flange, of a plurality of auxiliary tread sections adapted to cover the periphery of the fixed tread of the wheel and detachably secured to said annular coupling flanges, for the purpose set forth.

2. The combination, with a vehicle wheel having rigidly incorporated with its central basic structure and on each side thereof an annular concentric coupling flange, of a plurality of auxiliary tread sections adapted to cover the periphery of the fixed tread of the wheel and detachably secured to said annular coupling flanges, each of said auxiliary tread sections having a peripheral rail flange, for the purpose described.

3. The combination, with a vehicle wheel having rigidly incorporated with its central basic structure and on each side thereof an annular concentric coupling flange, of a plurality of auxiliary tread sections adapted to cover the periphery of the fixed tread of the wheel and detachably secured to said annular coupling flanges, each of said auxiliary tread sections having a peripheral rail flange which is adjustable thereon, for the purpose described.

4. The combination, with a vehicle wheel having rigidly incorporated with its central basic structure and on each side thereof an annular concentric coupling flange, of a plurality of auxiliary tread sections adapted to cover the periphery of the fixed tread of the wheel and detachably secured to said annular coupling flanges, detachable rail flanges on said auxiliary tread sections, and means for securing and adjusting said rail flanges on said auxiliary tread sections, for the purpose described.

5. The combination, with a vehicle wheel having rigidly incorporated with its basic central structure and on each side thereof an annular concentric coupling flange, of a plurality of auxiliary tread sections adapted to cover the periphery of the fixed tread of the wheel and detachably secured to said annular coupling flanges, the abutting ends of said auxiliary tread sections being beveled to contactually overlap each other, for the purpose described.

FREDERICK W. HOTTENROTH.

Witnesses:
  DOROTHY MIATT,
  GEO. WM. MIATT.